US007329887B2

(12) United States Patent
Henson et al.

(10) Patent No.: US 7,329,887 B2
(45) Date of Patent: Feb. 12, 2008

(54) SOLID STATE LIGHT DEVICE

(75) Inventors: Gordon D. Henson, Lake Elmo, MN (US); Bonnie Weiskopf Albrecht, Lake Elmo, MN (US); Donald K. Larson, Cedar Park, TX (US); John J. Simbal, Lakeway, TX (US); Michael A. Meis, Stillwater, MN (US); Michael E. Griffin, Maplewood, MN (US); Bruce R. Broyles, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 10/726,225

(22) Filed: Dec. 2, 2003

(65) Prior Publication Data

US 2005/0140270 A1 Jun. 30, 2005

(51) Int. Cl.
*H01J 1/62* (2006.01)

(52) U.S. Cl. .................... 250/494.1; 313/501; 359/726

(58) Field of Classification Search ..................... None
See application file for complete search history.

(56) References Cited

U.S. PATENT DOCUMENTS 3,825,335 A 7/1974 Reynolds
3,902,059 A 8/1975 McNamara, Jr.
4,254,453 A 3/1981 Mouyard et al.
4,386,824 A 6/1983 Draper
4,544,259 A 10/1985 Kanaoka et al.
4,755,918 A 7/1988 Pristash et al.
4,897,771 A 1/1990 Parker
4,914,731 A 4/1990 Chen
4,964,025 A 10/1990 Smith
5,146,248 A 9/1992 Duwaer et al.
5,227,008 A 7/1993 Klun et al.
5,293,437 A 3/1994 Nixon
5,299,222 A 3/1994 Shannon et al.

(Continued)

FOREIGN PATENT DOCUMENTS

DE 199 23 187 A1 11/2000

(Continued)

OTHER PUBLICATIONS

Žukauskas et al, *Introduction to Solid-State Lighting*, John Wiley & Sons, Inc., New York, 2002, pp. 166-167.

(Continued)

*Primary Examiner*—Jack I. Berman
*Assistant Examiner*—Zia R. Hashmi
(74) *Attorney, Agent, or Firm*—Jay R. Pralle

(57) ABSTRACT

A photon emitting device comprises a plurality of solid state radiation sources to generate radiation. The solid state radiation sources can be disposed in an array pattern. Optical concentrators, arranged in a corresponding array pattern, receive radiation from corresponding solid state radiation sources. The concentrated radiation is received by a plurality of optical waveguides, also arranged in a corresponding array pattern. Each optical waveguide includes a first end to receive the radiation and a second end to output the radiation. A support structure is provided to stabilize the plurality of optical waveguides between the first and second ends. The photon emitting device can provide a replacement for a discharge lamp device in various applications including road illumination, spot lighting, back lighting, image projection and radiation activated curing.

46 Claims, 10 Drawing Sheets

100 140 112 113 116 114 104 132 130 160 120 134 152 150 133 156 154

U.S. PATENT DOCUMENTS 5,301,090 A * 4/1994 Hed ........................... 362/558
5,302,999 A 4/1994 Oshida et al.
5,317,484 A 5/1994 Davenport et al.
5,420,768 A 5/1995 Kennedy
5,534,718 A 7/1996 Chang
5,567,032 A 10/1996 Heizmann
5,574,817 A 11/1996 Henson et al.
5,580,471 A 12/1996 Fukumoto et al.
5,611,017 A 3/1997 Lee et al.
5,629,996 A 5/1997 Rizkin et al.
5,634,711 A 6/1997 Kennedy et al.
5,661,839 A 8/1997 Whitehead
5,693,043 A 12/1997 Kittrell et al.
5,709,463 A 1/1998 Igram
5,713,654 A 2/1998 Scifres
5,727,108 A 3/1998 Hed
5,748,816 A 5/1998 Jaksic et al.
5,808,794 A 9/1998 Weber et al.
5,810,469 A 9/1998 Weinreich
5,816,694 A 10/1998 Ideker et al.
5,882,774 A 3/1999 Jonza et al.
5,886,313 A 3/1999 Krause et al.
5,909,037 A 6/1999 Rajkomar et al.
5,959,316 A 9/1999 Lowery
5,967,653 A 10/1999 Miller et al.
6,002,466 A 12/1999 Brauch et al.
6,045,240 A 4/2000 Hochstein
6,075,595 A 6/2000 Malinen
6,104,446 A 8/2000 Blankenbecler et al.
6,155,699 A 12/2000 Miller et al.
6,200,134 B1 3/2001 Kovac et al.
6,224,216 B1 * 5/2001 Parker et al. ................. 353/31
6,236,382 B1 5/2001 Kawakami et al.
6,290,382 B1 9/2001 Bourn et al.
6,318,886 B1 11/2001 Stopa et al.
6,340,824 B1 1/2002 Komoto et al.
6,343,872 B1 2/2002 Cerone et al.
6,350,041 B1 2/2002 Tarsa et al.
6,395,564 B1 5/2002 Huang
6,402,347 B1 6/2002 Maas et al.
6,406,172 B1 6/2002 Harbers et al.
6,414,801 B1 7/2002 Roller
6,417,917 B1 7/2002 Jung et al.
6,434,327 B1 8/2002 Gronet et al.
6,521,915 B2 2/2003 Odaki et al.
6,527,411 B1 3/2003 Sayers
6,556,734 B1 4/2003 Bischel et al.
6,560,038 B1 5/2003 Parkyn, Jr. et al.
6,587,573 B1 * 7/2003 Stam et al. ................. 382/104
6,603,258 B1 8/2003 Mueller-Mach et al.
6,692,250 B1 * 2/2004 Decaudin et al. ............. 433/29
6,733,711 B2 5/2004 Durocher et al.
6,809,342 B2 10/2004 Harada
6,821,143 B2 11/2004 Gasquet et al.
6,874,910 B2 4/2005 Sugimoto et al.
6,901,090 B1 5/2005 Ohtsuki
6,921,920 B2 7/2005 Kazakevich
6,943,380 B2 9/2005 Ota et al.
6,949,772 B2 9/2005 Shimizu et al.
6,954,565 B2 10/2005 Lindt
6,960,035 B2 11/2005 Okazaki et al.
7,029,277 B2 * 4/2006 Gofman et al. ............... 433/29
2001/0001207 A1 5/2001 Shimizu et al.
2001/0009510 A1 7/2001 Lodhie
2001/0010449 A1 8/2001 Chiu et al.
2001/0033712 A1 10/2001 Cox et al.
2002/0018199 A1 2/2002 Blumenfeld et al.
2002/0024055 A1 2/2002 Uemura et al.
2002/0113244 A1 8/2002 Barnett et al.
2002/0126479 A1 9/2002 Zhai et al.
2002/0171047 A1 11/2002 Chan et al.
2002/0176251 A1 11/2002 Plank et al.
2003/0001488 A1 1/2003 Sundahl
2003/0042493 A1 3/2003 Kazakevich
2003/0052594 A1 3/2003 Matsui et al.
2003/0057421 A1 3/2003 Chen
2003/0068113 A1 4/2003 Janz et al.
2003/0091277 A1 5/2003 Mei
2003/0117691 A1 6/2003 Bi et al.
2003/0142500 A1 7/2003 Bachl et al.
2003/0173575 A1 9/2003 Eisert et al.
2003/0175000 A1 9/2003 Caracci et al.
2003/0178627 A1 9/2003 Marchl et al.
2003/0185508 A1 10/2003 Fukuyama et al.
2003/0189829 A1 10/2003 Shimizu et al.
2003/0214571 A1 11/2003 Ishikawa et al.
2003/0233138 A1 * 12/2003 Spooner ...................... 607/93
2003/0235800 A1 12/2003 Qadar
2004/0008952 A1 1/2004 Kragl
2004/0106968 A1 6/2004 Yamada
2004/0159900 A1 8/2004 Ouderkirk et al.
2004/0164325 A1 8/2004 Siegel
2004/0166249 A1 8/2004 Siegel
2004/0190573 A1 9/2004 Kruschwitz et al.
2004/0262053 A1 12/2004 Ludewig et al.
2005/0177208 A1 8/2005 Irwin
2006/0044531 A1 3/2006 Potekev

FOREIGN PATENT DOCUMENTS

DE 100 25 563 A1 12/2001
DE 201 11 814 U1 12/2001
DE 201 20 770 U1 5/2002
DE 101 10 835 A1 9/2002
DE 101 34 381 A1 1/2003
DE 101 62 404 A1 7/2003
EP 0 181 193 A 5/1986
EP 0 249 934 12/1987
EP 0303741 2/1989
EP 0 338 641 A1 10/1989
EP 0 490 292 A2 6/1992
EP 0 588 040 A2 3/1994
EP 0 468 319 5/1996
EP 0 889 495 A1 1/1999
EP 1 067 332 A2 1/2001
EP 1 081 771 3/2001
EP 1108949 6/2001
EP 1 241 869 A 9/2002
EP 1 260 196 A2 11/2002
EP 1 372 008 12/2003
FR 2 662 896 12/1991
JP 2-142695 5/1990
JP 2-189803 7/1990
JP 07240536 A 9/1995
JP 8-8463 1/1996
JP 10-256694 9/1998
JP 11-284233 10/1999
JP 2002-065603 A 3/2002
WO WO95/20811 8/1995
WO WO99/41785 8/1999
WO WO 01/20398 A 3/2001
WO WO 01/59360 A1 8/2001
WO WO 02/054129 A1 7/2002
WO WO 02/086972 A1 10/2002
WO WO 03/023857 A2 3/2003
WO 03/077013 9/2003
WO 03/096387 11/2003
WO WO 04/004017 A2 1/2004
WO 2004/081475 9/2004

WO WO 05/062382 A2 7/2005

OTHER PUBLICATIONS

"Solid-State Laser/Fiber Optic Expose Machine," IBM Technical Disclosure Bulletin, IBM Corp. vol. 30, No. 10, New York, Mar. 1, 1988, pp. 249-250.

Hsu, J.T. et al., "Design of multi-chips LED module for lighting application", *Solid State Lighting II, Proceedings of SPIE* (2002), vol. 4776, pp. 26-33.

U.S. Appl. No. 10/317,734 filed Dec. 2, 2002 having Title—Optical fiber or Waveguide Lens.

U.S. Appl. No. 60/430,230 filed Dec. 2, 2002 having Title—Illumination System Using a Plurality of Remote Light Sources.

U.S. Appl. No. 60/443,232 filed Jan. 27, 2003 having Title—Methods of Making LED-excited Phosphor- based Light Sources.

U.S. Appl. No. 60/443,235 filed Jan. 27, 2003 having Title—LED-excited Phosphor-based Light Sources with Front Illumination.

U.S. Appl. No. 60/443,274 filed Jan. 27, 2003 having Title—LED-excited Phosphor-based Light Sources.

U.S. Appl. No. 10/670,630 filed Sep. 25, 2003 having Title—Lensed Optical Fiber and Method for Making the Same.

U.S. Appl. No. 10/726,222 filed Dec. 2, 2003 having Title—Illumination System Using A Plurality Of Light Sources.

U.S. Appl. No. 10/726,997 filed Dec. 2, 2003 having Title—Phosphor Based Light Sources Having a Polymeric Long Pass Reflector.

U.S. Appl. No. 10/726,244 filed Dec. 2, 2003 having Title—Reflective Light Coupler.

U.S. Appl. No. 10/727,220 filed Dec. 2, 2003 having Title—Illumination Assembly.

U.S. Appl. No. 10/726,248 filed Dec. 2, 2003 having Title—Multiple LED Source and Method for Assembling Same.

U.S. Appl. No. 10/727,072 filed Dec. 2, 2003 having Title—Phosphor Based Light Sources Having a Non-Planar Long Pass Reflector.

U.S. Appl. No. 10/726,257 filed Dec. 2, 2003 having Title—LED Curing Apparatus and Method.

U.S. Appl. No. 10/727,023 filed Dec. 2, 2003 having Title—Methods of Making Phosphor Based Light Sources Having an Interference Reflector.

* cited by examiner 140
116
112
114
104
113
120
160
134
132
130
133
156
152
150
154
100
100

SOLID STATE LIGHT DEVICE

RELATED APPLICATION

The present application is related to co-owned and concurrently filed U.S. Patent application entitled “Illumination System Using a Plurality of Light Sources” (U.S. application Ser. No. 10/726,222), incorporated by reference herein in its entirety. The present application is also related to co-owned and concurrently filed U.S. Patent applications entitled “Reflective Light Coupler” (U.S. application Ser. No. 10/726,244); “Multiple LED Source and Method for Assembling Same” (U.S. application Ser. No. 10/726,248); “LED Curing Apparatus and Method” (U.S. application Ser. No. 10/726,257); “Illumination Assembly” (U.S. application Ser. No. 10/727,220), “Phosphor Based Light Sources Having a Polymeric Long Pass Reflector” (U.S. application Ser. No. 10/726,997); and “Phosphor Based Light Sources Having a Non-Planar Long Pass Reflector” (U.S. application Ser. No. 10/727,072), each of which is incorporated by reference herein in its entirety.

BACKGROUND OF THE INVENTION

1. Field of the Invention

The present invention relates to an illumination or light device and system. More particularly, the present invention relates to a solid state light device and system that may replace current high intensity directed light sources.

2. Background Art

Illumination systems are used in a variety of applications. Home, medical, dental, and industrial applications often require light to be made available. Similarly, aircraft, marine, and automotive applications often require high-intensity illumination beams.

Traditional lighting systems have used electrically powered filament or arc lamps, which sometimes include focusing lenses and/or reflective surfaces to direct the produced illumination into a beam. Conventional light sources based on powered filament or arc lamps, such as incandescent or discharge bulbs, radiate both heat and light in 360 degrees. Thus, for vehicular headlight applications, the reflecting/focusing/collecting optics used in a conventional headlight must be designed and/or specially treated to withstand the constant heating effects caused by the high intensity (and high heat) discharge bulbs. In addition, these conventional headlights require sophisticated reflection optics to provide an industry requirements-based illumination output pattern.

Some current alternative approaches use a package of high power LEDs as the light source. The light emitted by such a source is directed with the aide of focusing optics into a single optical waveguide, such as a large core plastic optical fiber, that transmits the light to a location that is remote from the source/sources. In yet another approach, the single fiber may be replaced by a bundle of individual optical fibers. These present systems are inefficient, with approximately 70% loss of the light generated in some cases. In multiple fiber systems, these losses may be due to the dark interstitial spaces between fibers in a bundle and the efficiencies of directing the light into the fiber bundle.

SUMMARY OF THE INVENTION

In accordance with a first embodiment of the present invention, photon emitting device comprises a plurality of solid state radiation sources to generate radiation. The solid state radiation sources can be disposed in an array pattern. Optical concentrators, arranged in a corresponding array pattern, receive radiation from corresponding solid state radiation sources. The concentrated radiation is received by a plurality of optical waveguides, also arranged in a corresponding array pattern. Each optical waveguide includes a first end to receive the radiation and a second end to output the radiation. A support structure is provided to stabilize the plurality of optical waveguides between the first and second ends.

In exemplary embodiments, the radiation sources are individual LED dies or chips, or laser diodes. The waveguides may include optical fibers, such as polymer clad silica fibers. The first ends of the plurality of optical waveguides receive the radiation emitted from the radiation sources. The second ends of the plurality of optical waveguides may be bundled or arrayed to form a single radiation illumination source when illuminated.

The optical concentrators can be non-imaging optical concentrators, such as reflective couplers, that couple and concentrate light emitted from the radiation sources to provide useable emission to be guided through the corresponding optical waveguides. In an exemplary embodiment, each optical concentrator is in optical communication with and interposed between a corresponding LED die and a first end of a corresponding optical waveguide.

In accordance with another embodiment of the present invention, a photon emitting system comprises a solid state light source that includes a plurality of solid state radiation sources to generate radiation. The solid state radiation sources can be disposed in an array pattern. Optical concentrators, arranged in a corresponding array pattern, receive radiation from corresponding solid state radiation sources. The concentrated radiation is received by a plurality of optical waveguides, also arranged in a corresponding array pattern. Each optical waveguide includes a first end to receive the radiation and a second end to output the radiation. The system further includes a controller, coupled to the solid state light source, to selectively activate one or more individual LED dies and/or groups of the plurality of LED dies.

The above summary of the present invention is not intended to describe each illustrated embodiment or every implementation of the present invention. The figures and the detailed description that follow more particularly exemplify these embodiments.

Figures 1A, 1B:
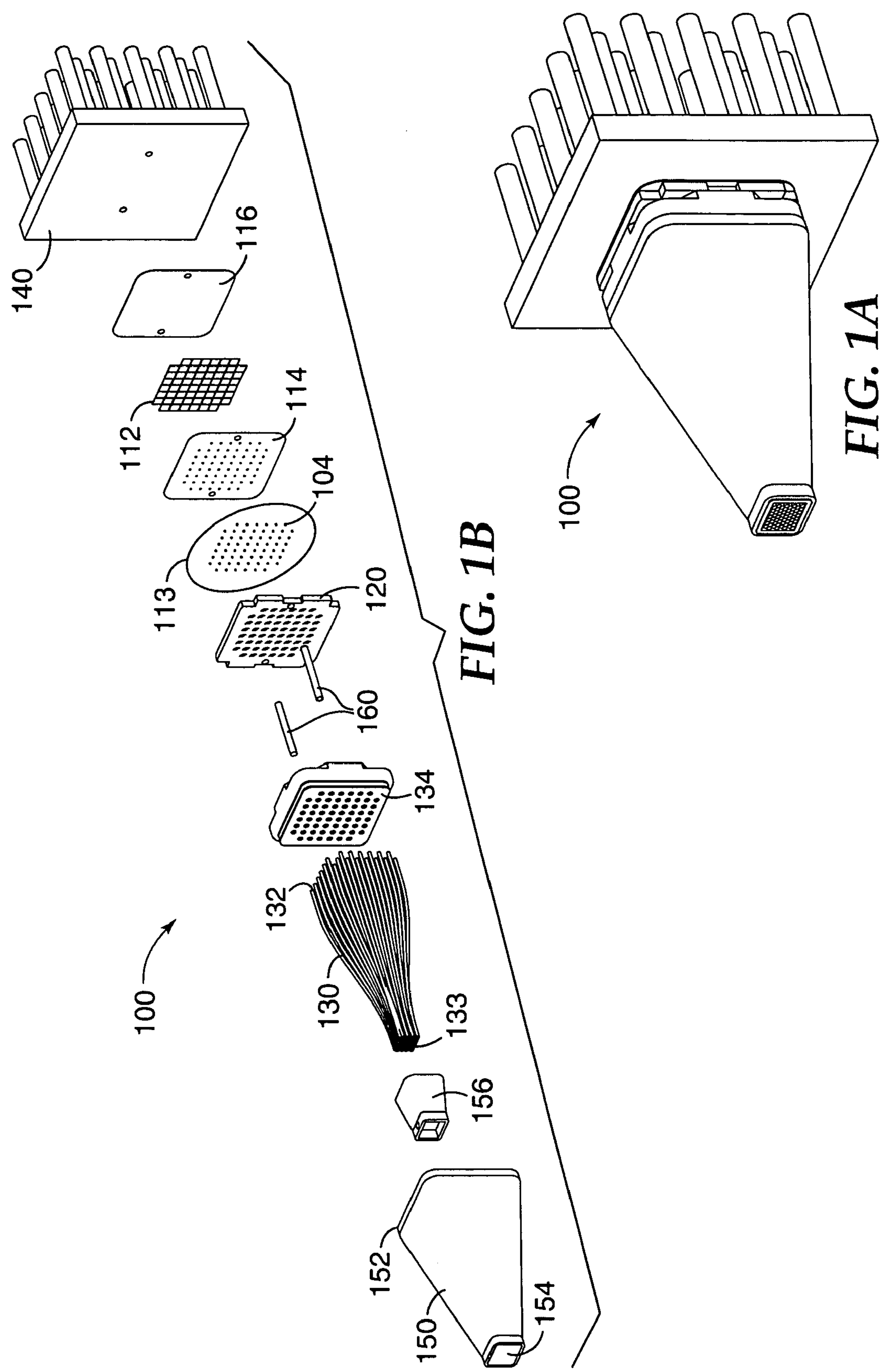
FIG. 1A shows a perspective view and FIG. 1B shows an exploded view of a photon emitting device according to a first embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

FIG. 1A shows a solid state light device 100 (also referred to herein as an illumination device or photon emitting device) in an exemplary configuration. Light device 100 is shown in an exploded view in FIG. 1B. By "light" it is meant electromagnetic radiation having a wavelength in the ultraviolet, visible, and/or infrared portion of the electromagnetic spectrum. In the construction described below, the light device 100 can have an overall compact size comparable to that of a conventional High Intensity Discharge (HID) bulb, thus providing a replacement for a discharge lamp device in various applications including road illumination, spot lighting, back lighting, image projection and radiation activated curing.

Light device 100 comprises an array of solid state radiation sources 104 to generate radiation. The radiation is collected and concentrated by a corresponding array of optical concentrators 120. The concentrated radiation is then launched into a corresponding array of waveguides 130, which are supported by a support structure 150. Each of these features will now be described in more detail.

In an exemplary embodiment, the solid state radiation sources 104 comprise a plurality of discrete LED dies or chips disposed in an array pattern. The discrete LED dies 104 are mounted individually and have independent electrical connections for operational control (rather than an LED array where all the LEDs are connected to each other by their common semiconductor substrate). LED dies can produce a symmetrical radiation pattern and are efficient at converting electrical energy to light. As many LED dies are not overly temperature sensitive, the LED dies may operate adequately with only a modest heat sink compared to many types of laser diodes. In an exemplary embodiment, each LED die is spaced apart from its nearest neighbor(s) by at least a distance greater than an LED die width. In a further exemplary embodiment, each LED die is spaced apart from its nearest neighbor(s) by at least a distance greater than six LED die widths. These exemplary embodiments provide for suitable thermal management, as explained in further detail below.

In addition, LED dies 104 can be operated at a temperature from −40 to 125° C. and can have operating lifetimes in the range of 100,000 hours, as compared to most laser diode lifetimes around 10,000 hours or halogen automobile headlamp lifetimes of 500–1000 hours. In an exemplary embodiment, the LED dies can each have an output intensity of about 50 Lumens or more. Discrete high-power LED dies can be GaN-based LED dies commercially available from companies such as Cree (such as Cree's InGaN-based XBright™ products) and Osram. In one exemplary embodiment, an array of LED dies (manufactured by Cree), each having an emitting area of about 300 μm×300 μm, can be used to provide a concentrated (small area, high power) light source. Other light emitting surface shapes such as rectangular or other polygonal shapes can also be utilized. In addition, in alternative embodiments, the emission layer of the LED dies utilized can be located on the top or bottom surface.

In some exemplary embodiments, a plurality of bare blue or ultraviolet (UV) LED dies can be utilized. In other exemplary embodiments, one or more LED dies can be coated, preferably on a light-emitting surface, with a phosphor layer (not shown), such as YAG:Ce phosphor. The phosphor layer can be used to convert the output of the LED die into "white" light. For example, a blue LED die can be coated with a YAG:Ce phosphor (or the like). In this example, a portion of the blue light from the LED die is mixed with the phosphor-converted yellow light to effectively generate "white" light. In another example, a mixture of RGB (red, green, blue) phosphors can be used to convert UV die output to "white" light. Phosphor layer placement and construction is described in detail in a co-owned and concurrently filed application Ser. No. 10/726,222 entitled "Illumination System Using a Plurality of Light Sources", incorporated by reference above.

In an alternative embodiment, a collection of red, blue, and green LED dies can be selectively placed in an array. The resulting emission is collected by the array of fibers 130 so that the light emitted from the output ends of the fibers is seen by an observer as colored light or "white" light, when blended together in concert.

In an alternative embodiment, the LED die array may be replaced with a vertical cavity surface emitting laser (VCSEL) array, which can conventionally provide output in the visible region, including "white" light.

As shown in FIG. 1B, the emission from LED dies 104 is received by a plurality of optical concentrators 120 which are disposed in a corresponding array pattern. In an exemplary embodiment, each optical concentrator receives radiation from a corresponding one of the LED dies 104. In an exemplary embodiment, the optical concentrators 120 comprise non-imaging optical concentrators (also referred to as reflective optical couplers) disposed in an array. The shape of the reflective surfaces of the optical concentrators 120 are designed to capture a substantial portion of the radiation emitted by each of the sources 104 to preserve the power density.

In addition, the concentrated output can be designed in a manner to substantially match the acceptance angle criteria of the light receiving waveguides, so that a substantial portion of the radiation is useably captured by the waveguides 130 and guided therethrough. In an exemplary embodiment, each non-imaging concentrator of the array of non-imaging concentrators 120 has an interior reflecting surface conforming to a two-dimensional (2-D) surface, with at least a second portion of the interior reflecting surface conforming to a three-dimensional (3-D) surface. This and other reflective surface designs are described in detail in the commonly owned and co-pending patent application Ser. No. 10/726,244 entitled "Reflective Light Coupler" filed concurrently, and incorporated by reference herein in its entirety.

Each optical concentrator in array 120 can be formed by, e.g., injection molding, transfer molding, microreplication, stamping, punching or thermoforming. The substrate or sheeting in which the optical concentrators 120 can be formed (singularly or as part of an array of optical concentrators) can include a variety of materials such as metal, plastic, thermoplastic material, or multilayer optical film (MOF) (such as Enhanced Specular Reflector (ESR) film available from 3M Company, St. Paul, Minn.). The substrate material used to form the optical concentrator 120 can be coated with a reflective coating, such as silver, aluminum, or reflective multilayer stacks of inorganic thin films, or simply polished in order to increase its reflectivity.

In addition, the optical concentrator substrate can be disposed so that the array of optical concentrators can be oriented beneath, around, or above the LED dies. In an exemplary embodiment, the optical concentrator substrate is disposed on or proximate to the LED array so that each concentrator of array 120 can be formed to slide over each LED die 104, so that the optical concentrator's lower opening 123 (see FIG. 4) provides a close fit around the perimeter of the LED die 104. Alternative concentrator designs include the additional use of a reflective coating on the substrate on which the LED die is supported.

An aspect of the illustrated embodiment of FIG. 1B is the one-to-one correspondence between each radiation source, a corresponding optical concentrator, and a corresponding waveguide. Each optical concentrator surface is designed to convert the isotropic emission from a corresponding LED die, including, in some embodiments, phosphor-coated LED die, into a beam that will meet the acceptance angle criteria of a corresponding light-receiving waveguide. As stated above, this concentrator surface design aids in preserving the power density of the light emitted from the LED dies.

Referring back to FIG. 1B, the concentrated output radiation is received by a plurality of optical waveguides 130, shown in FIG. 1B as an array of optical fibers, with each waveguide having an input end 132 and an output end 133. The present exemplary embodiment includes an array 130 of large-core (for example, 400 μm to 1000 μm) polymer clad silica fibers (such as those marketed under the trade designation TECS™, available from 3M Company, St. Paul, Minn.). In a further exemplary embodiment, each of the optical fibers 130 can comprise polymer clad silica fibers having a core diameter of about 600 μm to 650 μm. In exemplary embodiments, the longitudinal lengths of the fibers can be about 1 to 5 inches (2.5 cm–12.5 cm) in length. As the exemplary fibers are very flexible, this short distance still provides the ability to place the fibers in a tight, patterned bundle at the output ends. In addition, the short length provides for a very compact device having a size comparable to the size of conventional HID lamps. Of course, the fiber lengths can be increased in other applications without causing a detrimental effect in operation.

Other types of optical fibers, such as conventional or specialized glass fibers may also be utilized in accordance with the embodiments of the present invention, depending on such parameters as, e.g., the output wavelength(s) of the LED die sources. For example, plastic fibers may be susceptible to solarization and/or bleaching with applications involving deep blue or UV light sources.

Alternatively, as would be apparent to one of ordinary skill given the present description, other waveguide types, such as planar waveguides, polymer waveguides, flexible polymer waveguides, or the like, may also be utilized in accordance with the present teachings.

Once the light emitted by the LED die is collected and redirected by the concentrator into the light-receiving fiber, the fiber(s) can be used to transport the light to a specific location with low optical loss by total internal reflection. However, the light receiving fibers do not only serve to transport light—by translating the fibers from the wider spacing of the LED die array to a tighter spacing or spacings at the output aperture, such as a tight packed fiber bundle, light from the (relatively) dispersed LED array can be effectively concentrated into a very small area. Also, the optical design of the exemplary light receiving fiber core and cladding provide for shaping the light beams emerging from the bundled ends due to the Numerical Aperture (NA) of the fibers at the input end as well as the output end. As described herein, the light receiving fibers perform light concentrating and beam shaping, as well as light transportation.

The optical fibers 132 may further include fiber lenses on one or more of the output ends 133 of the optical fibers. Similarly, the light receiving ends 132 of the optical fibers 130 may each further comprise a fiber lens. Fiber lens manufacture and implementation is described in commonly owned and co-pending U.S. patent application Ser. Nos. 10/317,734 and 10/670,630, incorporated by reference herein.

A fiber array connector 134 can be utilized to support the first ends of each optical fiber of array 130. In an exemplary embodiment, the fiber array connector 134 comprises a rigid material, such as a molded plastic material, with a plurality of apertures having a pattern corresponding to the pattern of optical concentrators 120. Each aperture receives the input end 132 of an optical fiber of array 130 and can provide for straightforward bonding thereto.

In an exemplary embodiment, an interconnect circuit layer, rigid or flexible, can be utilized to provide thermal management for and electrical connection to the LED dies 104. As shown in FIG. 1B, the interconnect circuit layer can comprise a multilayer structure, such as 3M™ Flexible (or Flex) Circuits, available from 3M Company, Saint Paul, Minn. For example, the multilayer interconnect layer can comprise a metal mounting substrate 112, made of e.g., copper or other thermally conductive material, an electrically insulative dielectric layer 114, and a patterned conductive layer 113, where the LED dies are operatively connected to bond pads (not shown) of the conductive layer 113. Electrically insulative dielectric layer 114 may comprise of a variety of suitable materials, including polyimide, polyester, polyethyleneterephthalate (PET), polycarbonate, polysulfone, or FR4 epoxy composite, for example. Electrically and thermally conductive layer 113 may comprise of a variety of suitable materials, including copper, nickel, gold, aluminum, tin, lead, and combinations thereof, for example.

In an exemplary embodiment, and as described in more detail below, one or more groups of the LED dies 104 are interconnected with each other, but separate from other groupings of LED dies, to provide for pixelated radiation output. Vias (not shown) can be used to extend through the dielectric layer 114. The metal mounting substrate 112 can be mounted on a heat sink or heat dissipation assembly 140. The substrate 112 can be separated from heat sink 140 by a layer 116 of electrically insulative and thermally conductive material. In an exemplary embodiment, heat sink 140 can further comprise a series of thermal conductor pins to further draw heat away from the LED die array during operation.

In one exemplary embodiment, each bare LED die 104 can reside in a recessed portion of the dielectric surface 114, directly on the metal/circuit layer 113. Example implementations of interconnect circuitry are described in a currently pending and co-owned application Ser. No. 10/727,220 entitled "Illumination Assembly", incorporated by reference herein in its entirety.

In another embodiment, a more rigid FR4 epoxy based printed wiring board structure can be utilized for electrical interconnection. In yet another embodiment, a low cost circuit can be prepared by patterning conductive epoxy or conductive ink onto a suitable substrate as required to connect the LED die array.

Solid state light device 100 further includes a support structure. In the exemplary embodiment of FIG. 1B, the support structure is configured as a housing 150, having an input aperture 152 and an output aperture 154. The housing 150 can be formed, e.g., by a molding process. The housing 150 provides strain relief for the array of waveguides 130 between the input and output ends and can prevent damage to the waveguides 130 from outside sources. In addition, housing 150 can provide a rigid support that is preferred for vehicular applications, such as those described in more detail below. Optionally, the support structure can further include a banding 156 that is disposed in contact with a perimeter portion of the second ends of waveguides 130. The banding 156 can aid in distributing the output ends 134 of waveguides 130 in a selected output pattern, as is described in further detail below.

In addition, the fiber array connector 134 can include a ridge or indentation to receive the input aperture 152 of housing 150. While the housing 150 may be bonded or otherwise attached to fiber array connector 134, in an exemplary embodiment, the housing 150 is snap fit on fiber array connector 134.

In an exemplary construction method, the fibers are first loaded into the fiber array connector and bonded to the connector. A fixture (not shown) can be utilized to group fibers in rows to have an ordered grouping. The fixture can comprise multiple partitions that repeatably position each fiber from the input end to the output end. In addition, the fixture can be designed so that the fibers do not cross over one another and have a predictable location for the output ends. To secure the output end, a rigid or flexible banding, e.g. ceramic or polymer material, can be utilized to fix the location of the fibers within a desired output pattern.

Further, in an exemplary embodiment the support structure can include a housing that can be slid over the fibers and banding and can be secured to the fiber array connector. The banding can be secured within the output aperture of the housing through the use of conventional adhesives or bonding elements. Alternatively, the support structure can comprise an encapsulate material that is formed throughout and around the fiber bundle(s).

Alternatively, support structure 150 can comprise an adhesive material, such as a binding epoxy, which can be applied to a portion of the waveguides 130, such that when the adhesive sets, the waveguides are fixed in a desired pattern. In an exemplary embodiment where the waveguides are optical fibers, the binding epoxy is also useful in providing support for the output ends of the fibers for polishing. The binding epoxy or adhesive can have a temporary or permanent set.

Overall alignment can be provided by one or more alignment pins 160, which can be used to align fiber array connector 134, concentrator array 120, interconnect circuit layer 110 and heat sink 140 together. A series of alignment holes, such as alignment holes 162 shown in FIG. 2, can be formed in each of the aforementioned parts of the device 100 to receive the alignment pins 160. Alignment of the optical concentrator array 120 to the interconnect circuit layer can be accomplished through the use of fiducials (not shown).

Figure 2:
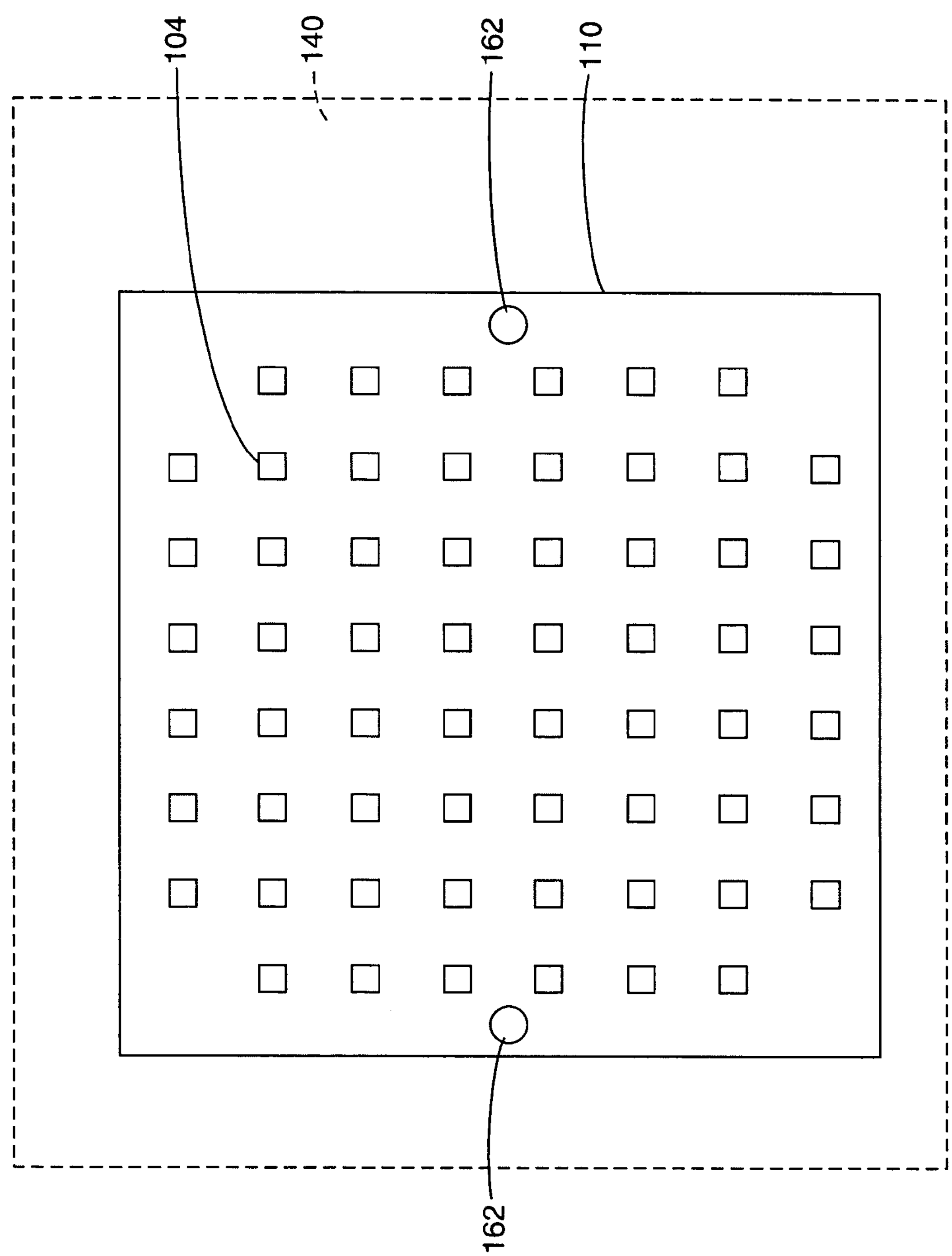
FIG. 2 shows a top view of an exemplary LED die array disposed on an interconnect circuit according to an embodiment of the present invention.

FIG. 2 illustrates the footprint of the solid state light device 100. In this exemplary configuration, an array of sixty (60) LED dies 104 can be provided on an interconnect circuit layer 110, which is thermally coupled to heat sink 140, in a substantially rectangular array pattern. Of course, in accordance with the present invention, the array of LED dies can comprise a substantially greater or lesser number of LED dies 104. However, as each LED die has a width of about 300 micrometers, and each LED die 104 can be spaced from its nearest neighbor by more than a LED die width, the solid state light source of the present invention can provide a high overall power density, a compact footprint area (about 1 $in^2$ to 4 $in^2$, or 6.5 $cm^2$ to 26 $cm^2$) and adequate thermal control. The footprint of the output ends can be smaller, the same as, or greater than the footprint at the input ends. For example, the footprint of the output ends of the fibers 133 (see FIG. 1B) can be even more compact, on the order of about 0.1 $in^2$ to 1 $in^2$ (0.65 $cm^2$ to 6.5 $cm^2$), in exemplary embodiments.

Figure 3:
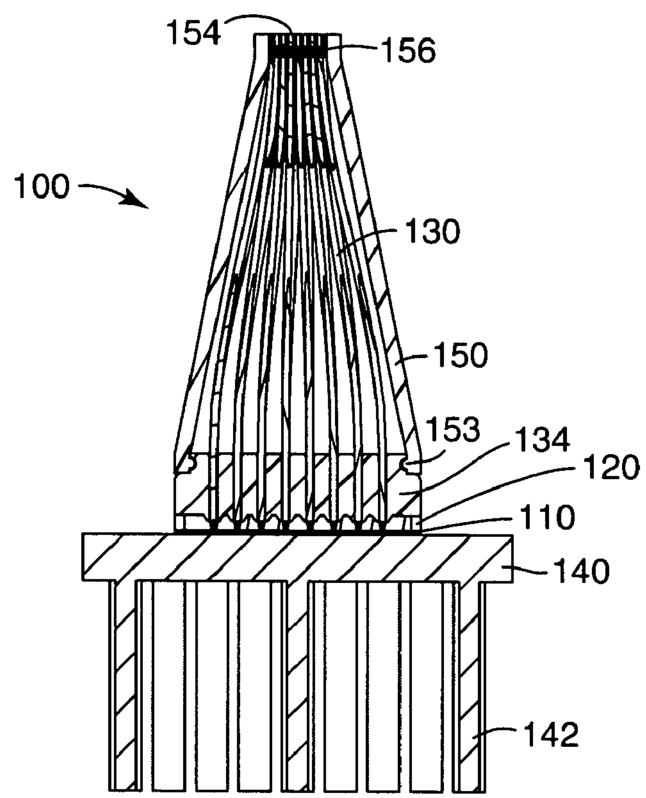
FIG. 3 shows a side view of a photon emitting source according to an embodiment of the present invention.

A side view of solid state light device 100 is shown in FIG. 3. In this exemplary embodiment, interconnect circuit layer 110 (having LED dies mounted thereon) is disposed on heat sink 140, which further includes heat dissipation pins 142 that extend in an opposite direction from the output aperture 154. In addition, as described above, the housing 150 can include protrusions 153 to allow for snap fitting onto fiber array connector 134. The array of optical concentrators 120 is disposed between the fiber array connector 134 and the interconnect layer 110. In this embodiment, fibers 130 are supported by the fiber array connector 134 and the banding 156, which is disposed within the output aperture 154 of housing 150.

Figure 4:
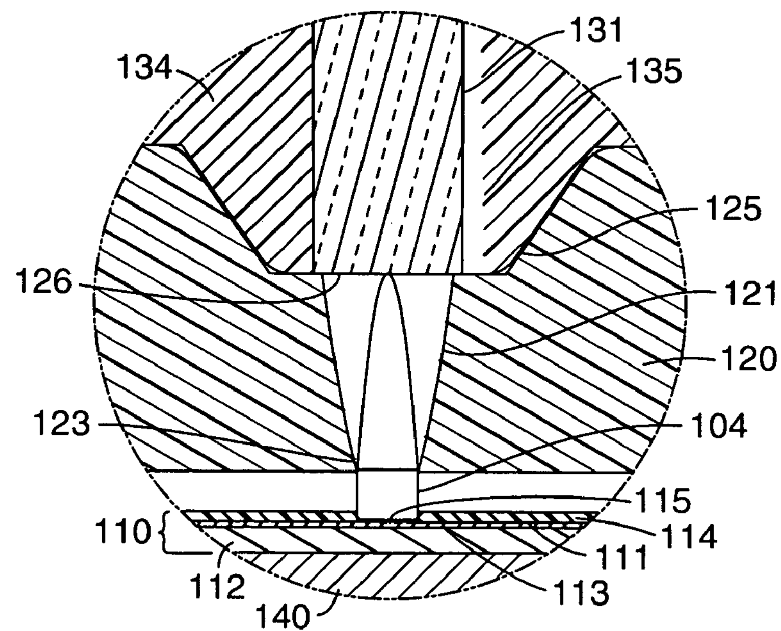
FIG. 4 shows a close-up view of an individual LED die coupled to an optical fiber by a non-imaging optical concentrator according to an embodiment of the present invention.

As shown in greater detail in FIG. 4, an exemplary construction of the solid state light device includes a fiber-concentrator alignment mechanism that reduces misalignment between an individual optical fiber 131 of the fiber array and an individual optical concentrator 121 of the concentrator array. In particular, the fiber array connector 134 can further include a protrusion portion 135 that engages in a depression portion 125 of the optical concentrator array substrate. Thus, fiber 131 is received in an aperture of the fiber array connector 134. The fiber array connector is then disposed on the optical concentrator substrate such that protrusion 135 is received by depression 125. In this manner, the output aperture 126 of optical concentrator 121 can be substantially flush with the input end of fiber 131. In addition, with this exemplary design, multiple input ends of the fibers can be polished at the same time so that the fiber ends are positioned with respect to the optical concentrators for sufficient optical coupling. In addition, in the example construction of FIG. 4, the receiving aperture 123 of optical concentrator 121 can be disposed to be proximate to or to surround the perimeter of an emission surface of a corresponding LED die 104. Although not shown, spacers located between the optical concentrator substrate and the interconnect circuit layer can set the proper spacing between these two components. The optical concentrator substrate can then be affixed to the spacers or otherwise bonded to the interconnect circuit layer using conventional techniques.

FIG. 4 further shows a cross section of an exemplary multiple layer interconnect 110, which comprises a conductive epoxy 115 to bond LED die 104 10 interconnect layer 110. First and second electrically conductive layers 113, 111 (that can comprise, e.g., nickel and gold, or other conductive materials), provide electrical traces to each LED die in the array, with dielectric layer 114 (e.g., polyimide) disposed to provide electrical insulation. A substrate 112 (e.g., copper) is provided to support the conductive and insulating layers, as well as to provide thermal conductivity to the heat sink 140 to conduct heat away from the direction of emission.

In accordance with the principles described herein, the solid state light device can provide a highly directional and/or shaped output emission, in one or more directions simultaneously. As shown in FIGS. 1A and 1B, the output ends 133 of fiber array 130 can be patterned to provide a rectangular or square output. FIGS. 5A-5F illustrate alternative reconfigurable output end patterns for the fiber array that can be employed depending on the type of illumination that is required for a particular application.

Figure 5A:
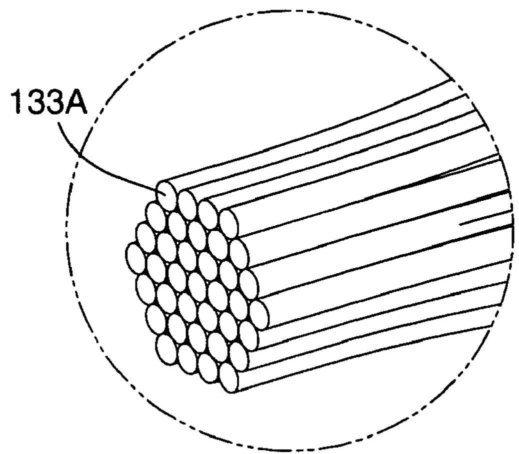
FIGS. 5A–5F show alternative fiber output patterns according to alternative embodiments of the present invention.
Figure 5B:
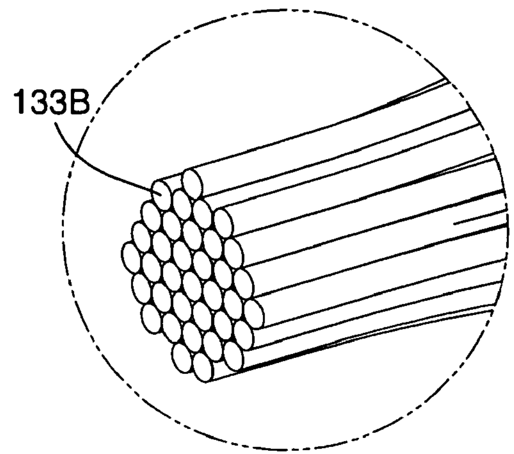
Figure 5C:
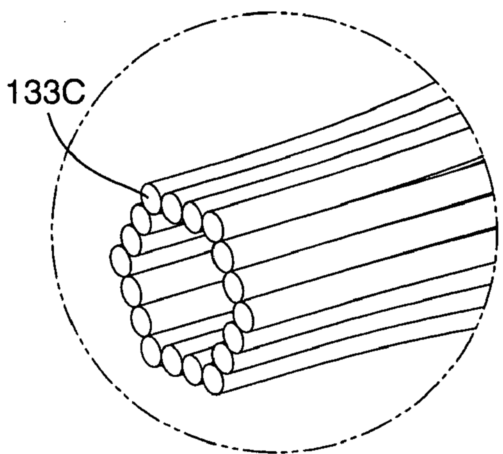
Figure 5D:
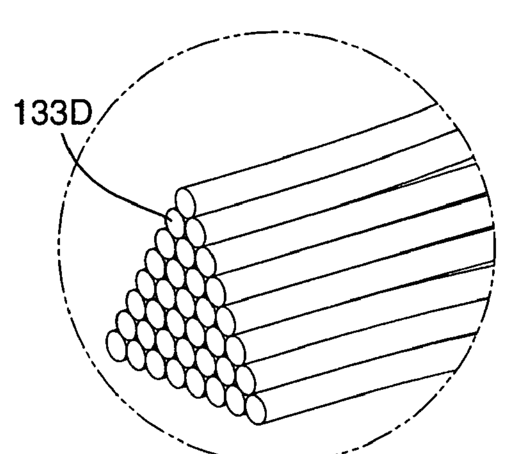
Figure 5E:
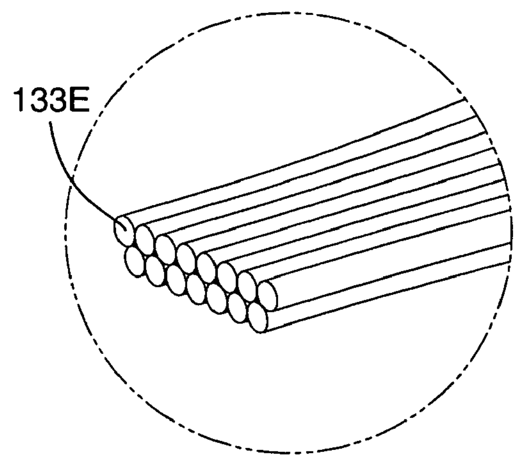
Figure 5F:
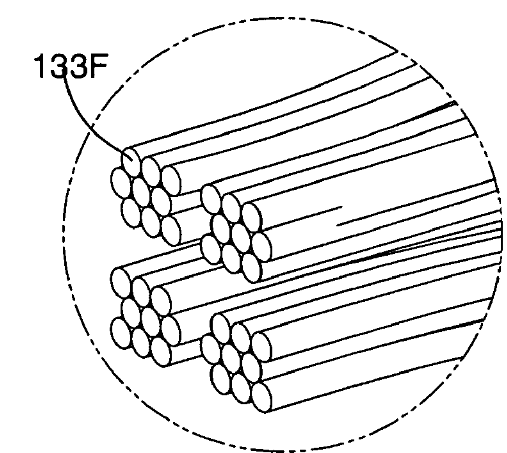

For example, FIG. 5A shows a hexagonal output fiber pattern 133A, FIG. 5B shows a circular output fiber pattern 133B, FIG. 5C shows a ring-shaped output fiber pattern 133C, FIG. 5D shows a triangular output fiber pattern 133D, and FIG. 5E shows a line-shaped output fiber pattern 133E. In addition, as shown in FIG. 5F, in an alternative exemplary embodiment, a segmented output pattern 133F can be provided, where multiple separate fiber output groupings can be utilized for specific targeted illumination. As the banding that secures the output ends of the fibers can be formed from a material with flexibility, such as lead, tin, and zinc-based materials and alloys (or the like), in some applications, the fiber output pattern can be reconfigurable.

Figure 6A:
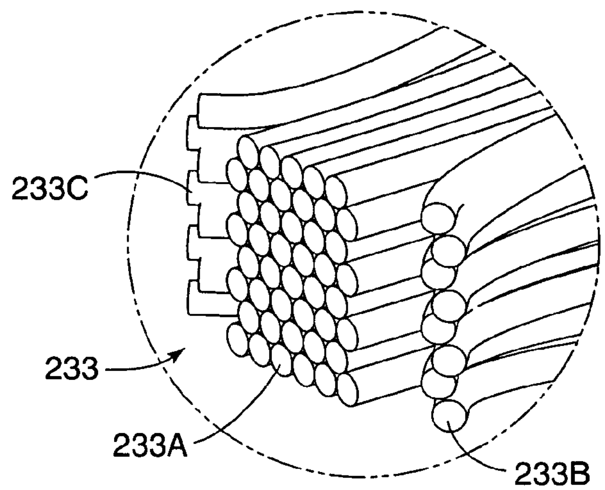
FIG. 6A shows an alternative fiber output pattern for a steerable output and FIGS. 6B and 6C respectively show exemplary banding and support structure implementations for a steerable output in accordance with alternative embodiments of the present invention.
Figure 6B:
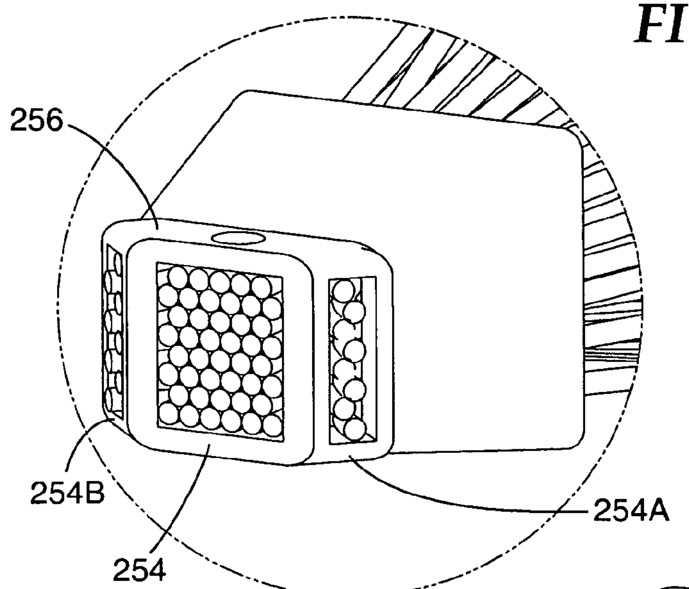
Figure 6C:
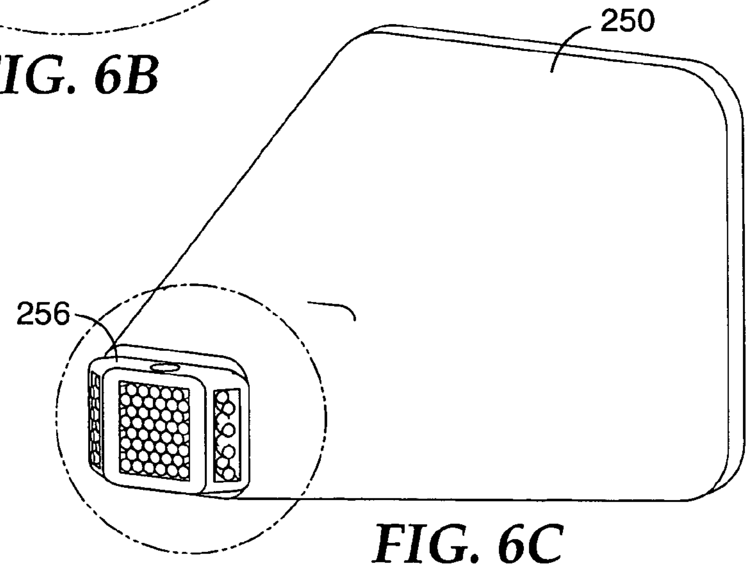

As shown in FIGS. 6A-6C, the output of the solid state light device can be steerable, so that one or more different directions can be illuminated simultaneously or alternatively. FIG. 6A shows fiber output ends 233 arranged, e.g., in three different groupings, 233A, 233B, and 233C. For example, when utilized as a vehicular headlight, the solid state light device can provide output illumination in a forward direction through output ends 233A under normal operation. In the event that the vehicle is turning to a side, the LED dies that correspond to the output fibers 233B can be activated (by, e.g., a trigger signal such as a turn signal indicator or by turning the steering wheel a set amount) so that additional illumination can be provided in that side direction through output fibers 233B. Similarly, if turning to the other side, the LED dies which correspond to the output fibers 233C can be activated so that additional illumination can be provided in that other side direction.

Alternatively, a steerable illumination system can be provided utilizing a laterally extended output arrangement of fibers, such as shown in FIG. 5E, whereby the pixelation control circuitry described below (see e.g., FIGS. 9A and 9B) can activate blocks of illuminated fibers from one side to the other, e.g., during a turn or other event. In this manner, the output illumination can be directed towards (or away from) the direction of the turn, depending on the application.

In this manner, a non-mechanical approach can be used to provide steerable output illumination from the solid state light device. Alternatively, as would be apparent to one of ordinary skill in the art given the present description, greater or fewer fiber groupings can be utilized. In addition, the groupings can have a different relative orientation, such as for high beam—low beam output emissions from the same solid state light source.

In FIG. 6B, a construction is shown that can be utilized to stabilize and support the different fiber groupings. For example, a banding 256 is provided at the output ends of the optical fibers. The banding 256 can provide a first aperture 254, a second aperture 254A and a third aperture 254B, where the fibers disposed in apertures 254A and 254B will output light in different directions from the fibers disposed in aperture 254. In addition, as shown in FIG. 6C, the banding 256 can be connected to or integral with housing 250, as part of the support structure for the solid state light device.

Figure 7:
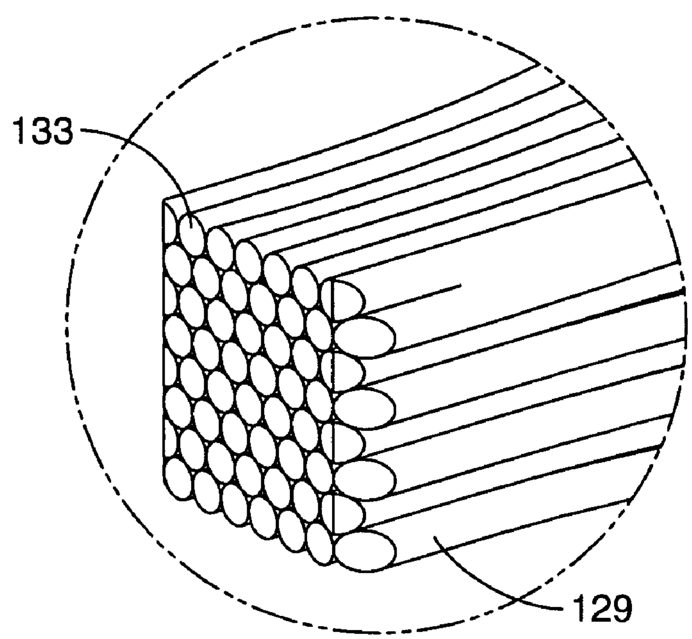
FIG. 7 shows another alternative output pattern for a steerable output, where a portion of the output ends of the fibers have angle polished output faces in accordance with an alternative embodiment of the present invention.

Alternatively, as shown in FIG. 7, the solid state light device can generate steerable light from a single bundle of fiber output ends. For example, fiber output ends 133 can be provided in the same location, such as output aperture 254 from FIG. 6B. In this exemplary embodiment, a portion of these output ends, identified as fiber output ends 129, are angle polished at a different angle, or even substantially different angle (e.g., by 10 to 50 degrees with respect to the fiber axis), than the remainder of fiber output ends 133. The resulting emission will be directed in a different direction from that of the output of fiber ends 133. Thus, similar to the application discussed above with respect to FIGS. 6A-6C, when utilized as a vehicular headlight, the solid state light device can provide output illumination in a both a forward direction (through output ends 133) and a side direction (through output fibers 129).

Figure 13:
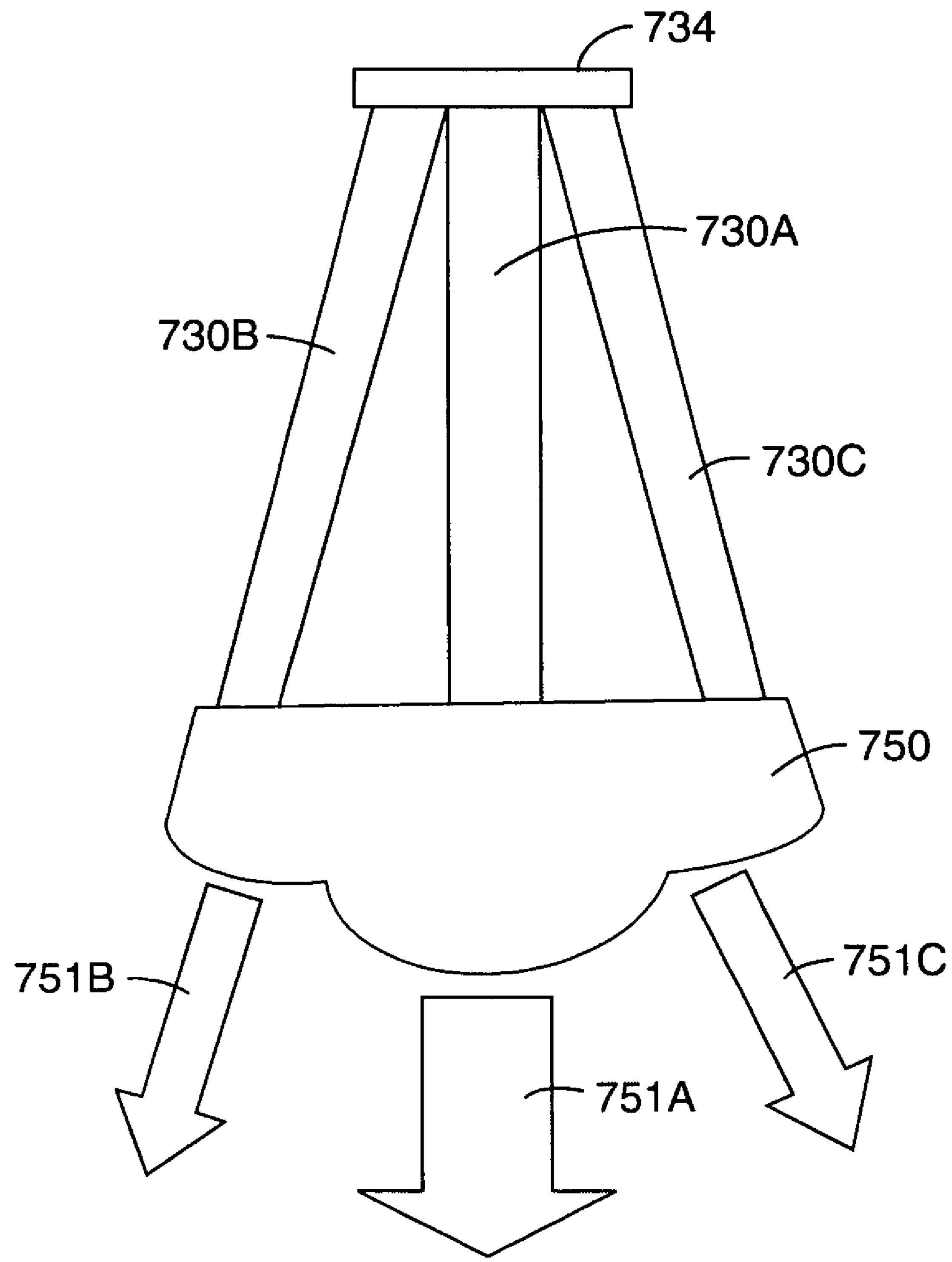
FIG. 13 shows an alternative embodiment for a steerable output emission.

In an alternative embodiment to provide steerable illumination, illustrated in FIG. 13, fibers extending from fiber array connector 734 can be bundled into multiple offset fiber bundles, central bundle 730A and side bundles 730B and 730C. Light emitted by the output ends of the fiber bundles is received by a multi-focus lens 750, such as an aspheric lens, that further directs the output from the offset bundles into desired different illumination regions 751A, 751B, and 751C. The steerable illumination can be performed automatically and/or through operator control.

Figure 8:
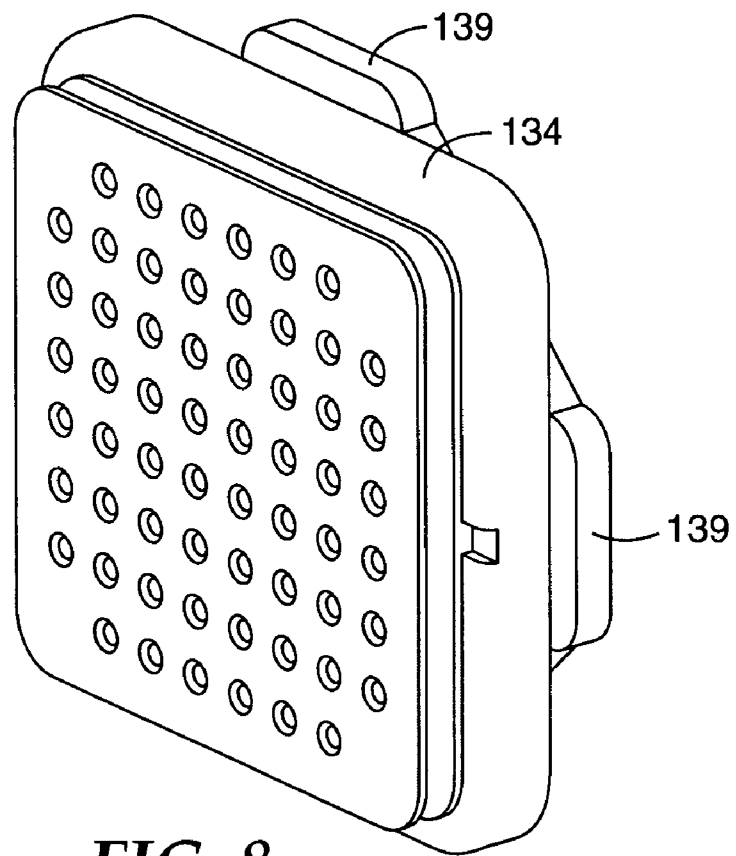
FIG. 8 shows an alternative construction for a fiber array connector in accordance with an embodiment of the present invention.

In an exemplary embodiment of the present invention, the solid state light device can be utilized as an illumination source, such as in a vehicle headlight application. For example, attachment to an existing headlight receptacle can be accomplished through the use of flanges 139, shown in FIG. 8. Flanges 139 can be disposed on the perimeter portion of e.g., the fiber array connector 134. The flange can be designed to engage in a locking slot of such a receptacle. Alternatively, the flanges may be formed on other components of the solid state light device, such as the housing or optical concentrator substrate.

Figure 9A:
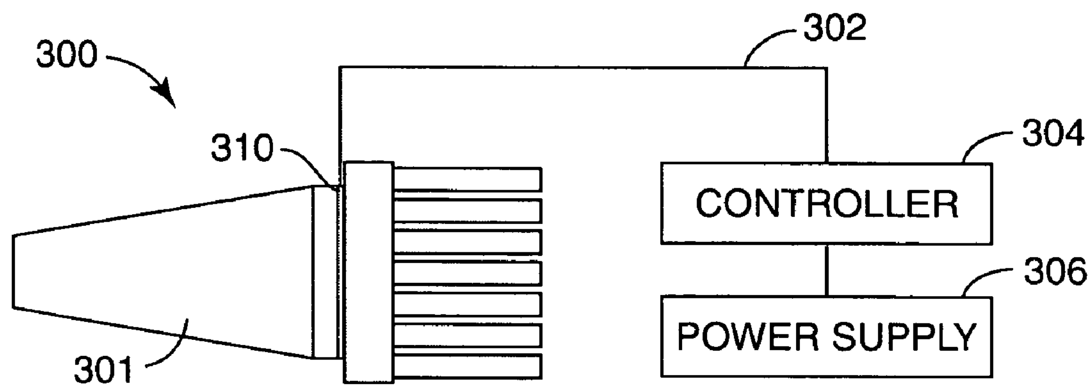
FIG. 9A shows a photon emitting system adapted for pixelation in accordance with another embodiment of the present invention.

According to another embodiment of the present invention, as shown in FIG. 9A, an illumination system 300 is provided that allows for pixelated light control that can be used for aperture shaping and/or dynamic beam movement. System 300 includes a solid state light source 301 that is constructed in a manner similar to solid state light source 100 described above. A controller 304 is coupled to solid state light source 301 via wiring 302 and connector 310, which can be connected to the interconnect circuit layer. A power source 306 is coupled to the controller 304 to provide power/current to the solid state light source 301.

In an exemplary embodiment, controller 304 is configured to selectively activate individual LED dies or groups of LED dies that are contained in solid state light source 301. In addition, as the light receiving waveguides are provided in a one to one correspondence with the LED dies, the illumination system 300 can provide a pixelated output. This type of pixelated control allows for the control of differently colored (e.g., red, green, and blue for RGB output) or similarly colored (e.g., white) LED dies.

Figure 9B:
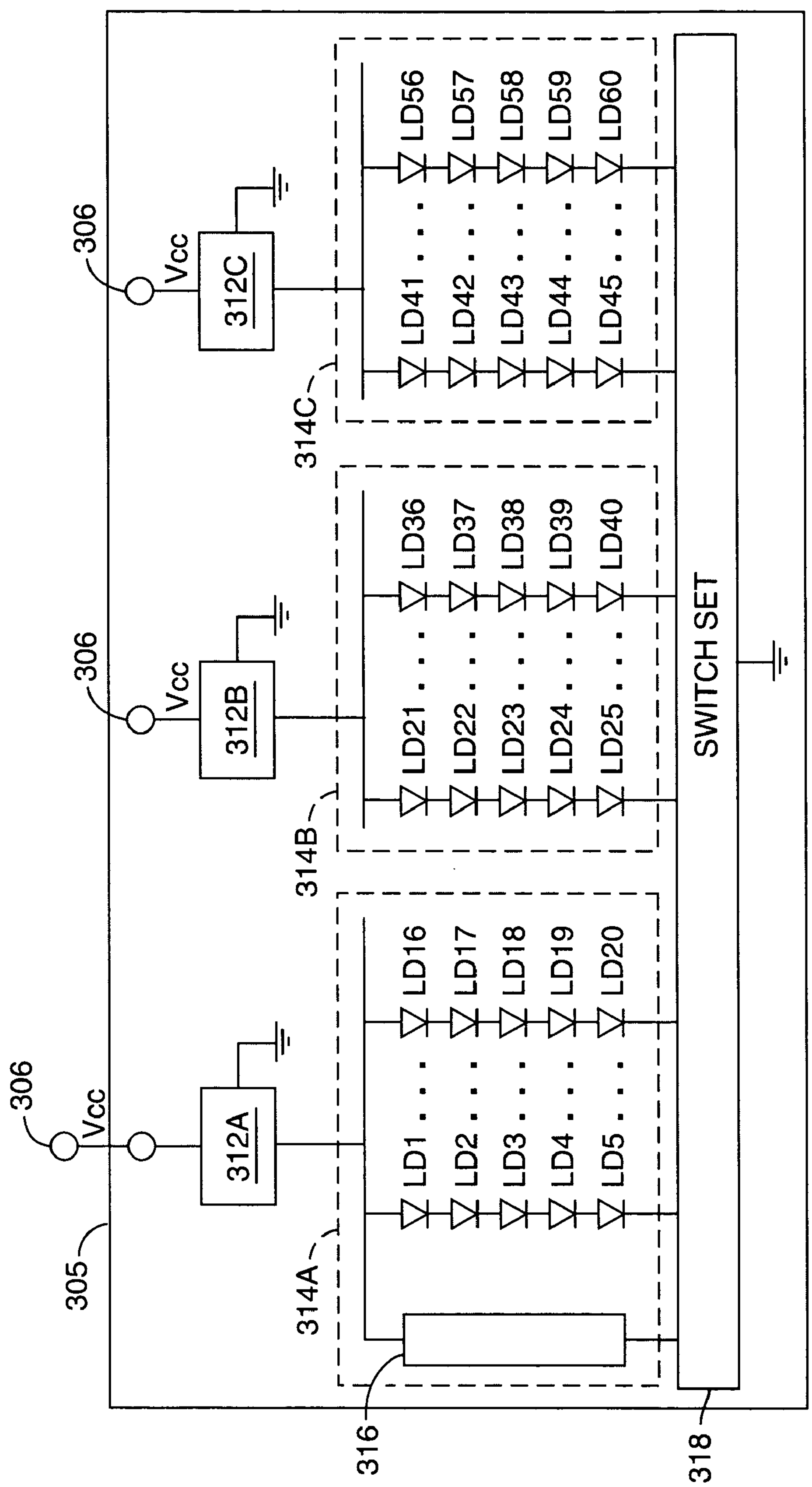
FIG. 9B shows an exemplary controller circuit adapted for pixelation in accordance with another embodiment of the present invention.

FIG. 9B shows an example control circuit 305 that can provide pixelation to the array of LED dies contained in the solid state light device. In this example, sixty LED dies (LD1–LD60) are provided in the LED die array, which are grouped into three large groupings (314A–314C) of twenty LED dies each, which are each further divided into smaller subgroups or channels (e.g., LD1–LD5) of five LED dies each. Overall, twelve channels of five LED dies each can be separately controlled in this exemplary embodiment. In one example implementation, in an RGB output application, a first grouping of LED dies can comprise red emitting LED dies, a second grouping of LED dies can comprise blue emitting LED dies, and a third grouping of LED dies can comprise green emitting LED dies. Alternatively, in another example implementation, first, second, and third groupings of LED dies can comprise "white" emitting LED dies.

In addition, the interconnect circuit layer is also designed to provide separate interconnection for the different LED die groupings. Different types of LED die groupings, and greater or lesser numbers of LED dies, can also be utilized in accordance with the principles described herein. With this configuration, separate RGB LED die channels can be driven to provide "white" or other colored output. In addition, should a particular diode channel fail or be dimmed due to LED die deterioration, adjacent channels can be driven at higher currents so that the output illumination appears to remain unchanged. Because of the (relatively) wide LED die spacing and/or the thermal management capabilities of the interconnect layer, greater drive currents to some of the LED die channels will not adversely affect overall performance.

In addition, temperature sensors (not shown) can be disposed on the interconnect circuit layer (or other suitable locations) to sense temperature changes at or near different LED die channels. In this manner, the control circuit 305 can be used to vary the amount of current in a particular channel to compensate for a general decrease in light output in that channel due to the elevated temperature.

In more detail, circuit 305 receives a voltage through power supply 306. The voltage is converted into a regulated output current/voltage supply by boost converter chips 312A–312C, and their associated electronics (not shown). In this manner, voltage variations from power source 306 can be mitigated, with the current/voltage supplied to the LED dies being maintained at a regulated level. Chips 312A–312C can comprise, e.g., LM2733 chips available from National Semiconductor. In this exemplary embodiment, driving voltage/current parameters can be about 20 Volts at 80–100 mA, thus providing a total of about 1.0 to 1.2 A for the entire LED die array. The driving current/voltage is then supplied to the different LED die channels within the array. In this example, each LED die would nominally require about 20 mA bias current, with a bias threshold increasing as the current increases, approaching about 4.0 V for an exemplary GaN-based LED die array. Of course, differing LED die efficiencies or compositions may require differing bias and driving levels.

In addition, a resistor/thermistor chain 316 can be included in circuit 305 to set the overall maximum current for each LED die channel. Further, a switch set 318, comprising a corresponding number of LED die channel electronic switches, can be provided, whereby each LED die channel is coupled/decoupled to ground (or to power, depending on the switch set arrangement relative to the LED die channels) in order to activate each particular LED die channel. The switch set 318 can be automatically controlled by a microcontroller (not shown) or a remote switch (e.g., a turn signal), based on the illumination parameters required for a particular application. Of course, this circuit architecture permits many implementations and permutations, as would be understood by one of ordinary skill in the art given the present description. For example, the control circuit 305 can be implemented to drive all LED dies with the same current, or alternatively, a given LED die channel can be turned on/off automatically or on command. By adding a fixed or variable resistance to the switch legs of the switch set, differing currents can be applied to each channel.

Figure 10:
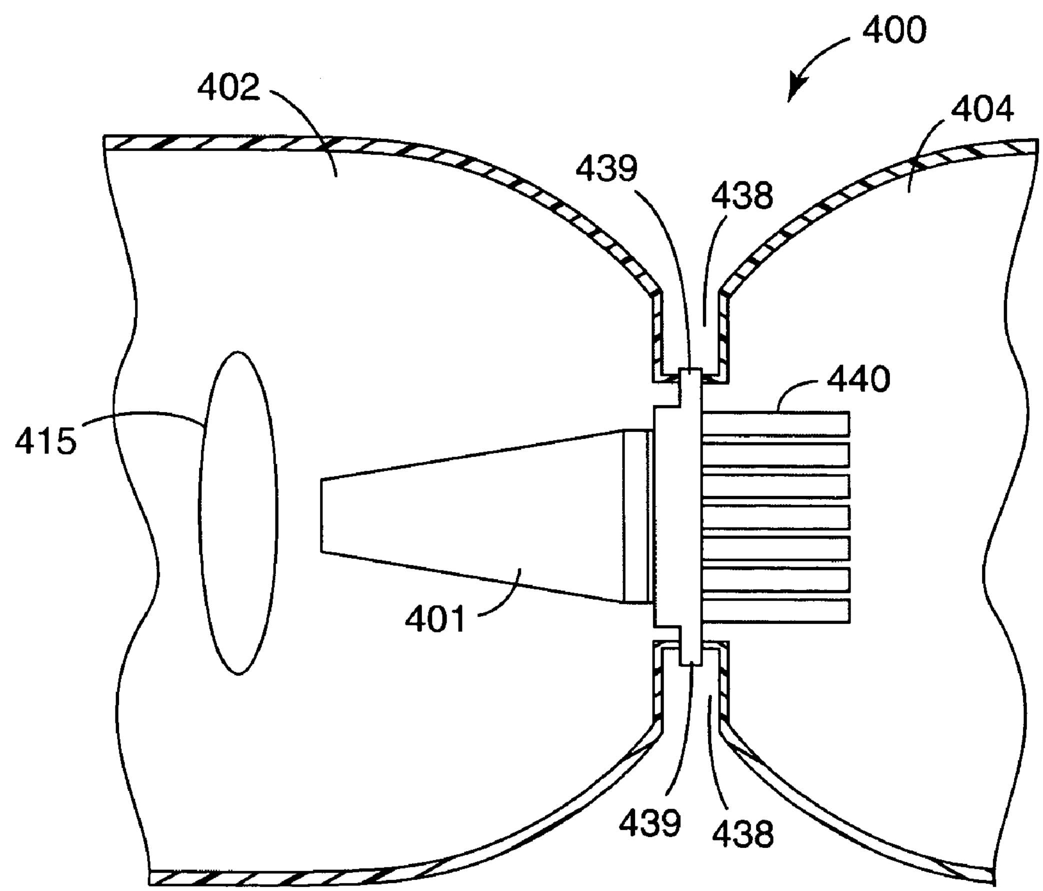
FIG. 10 shows an exemplary implementation of the photon emitting device, here utilized as a "cool" headlight.

FIG. 10 shows a schematic illustration of an exemplary solid state light device 401 utilized in a "cool" headlamp application. For example, solid state light device 401, which can be configured in accordance with the embodiments described above, is disposed in a headlight compartment 402 of an automobile or other vehicle (not shown). Light device 401 can be secured in compartment 402 through the use of slidably engaging flanges 439 that are configured to slide and lock within slots 438 of a receptacle. Thus, the heat sink 440, which draws heat away from the direction of light output is located in a separate compartment 404, such as the interior engine compartment of an automobile or other vehicle. The beam-shaped output illumination can be collected/focused into a requirements-based illumination pattern by an optical element 415. Optical element 415 can be designed to provide a selected output pattern that complies with current safety organization (e.g., NHTSA) standards. Example optical elements can include aspheric/anamorphic optical elements, and/or discontinuous and/or non-analytic (spline) optical elements.

With this approach, the use of complicated reflection optics disposed in headlight compartment 402 can be avoided. In addition, as heat is drawn away from compartment 402, there is no need to specially heat-treat any remaining optical elements in compartment 402, thus avoiding potential performance degradation caused by exposure to continual high intensity heat. Further, if solid state light device 401 is provided with an output fiber and output aperture structure such as shown above in FIGS. 6A–6C, steerable output illumination can be accomplished without having to utilize moving mirror, bulb, and/or lens mechanisms that currently must be employed when steering the output from conventional HID lamps.

Figure 11:
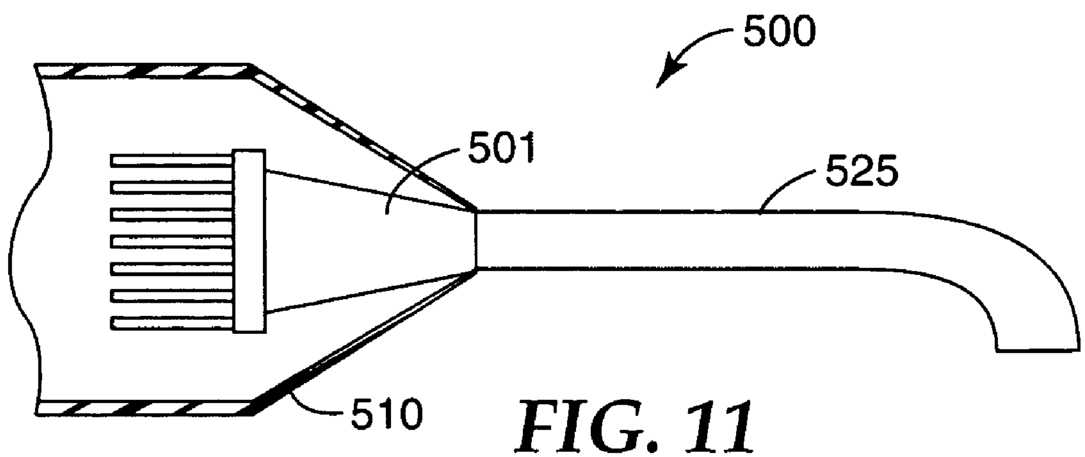
FIG. 11 shows another exemplary implementation of the solid state light device, here utilized as part of a dental curing apparatus.

The solid state light device described herein may also be utilized in other applications. For example, FIG. 11 shows a schematic dental curing application, where solid state light device 501 (having a similar construction to that shown in FIGS. 1A and 1B, and/or other embodiments herein) is contained in dental curing apparatus 500. The solid state light device 501 can be disposed in a handle portion 510 of dental curing apparatus 500. In addition, the output fibers used to receive and guide the output from the LED dies or other solid state light generating sources may extend through a light delivery arm 525 that can be placed directly over the curable material. In this application, UV and/or blue radiation sources may be utilized depending on the curing aspects of the materials receiving the illumination.

Figure 12:
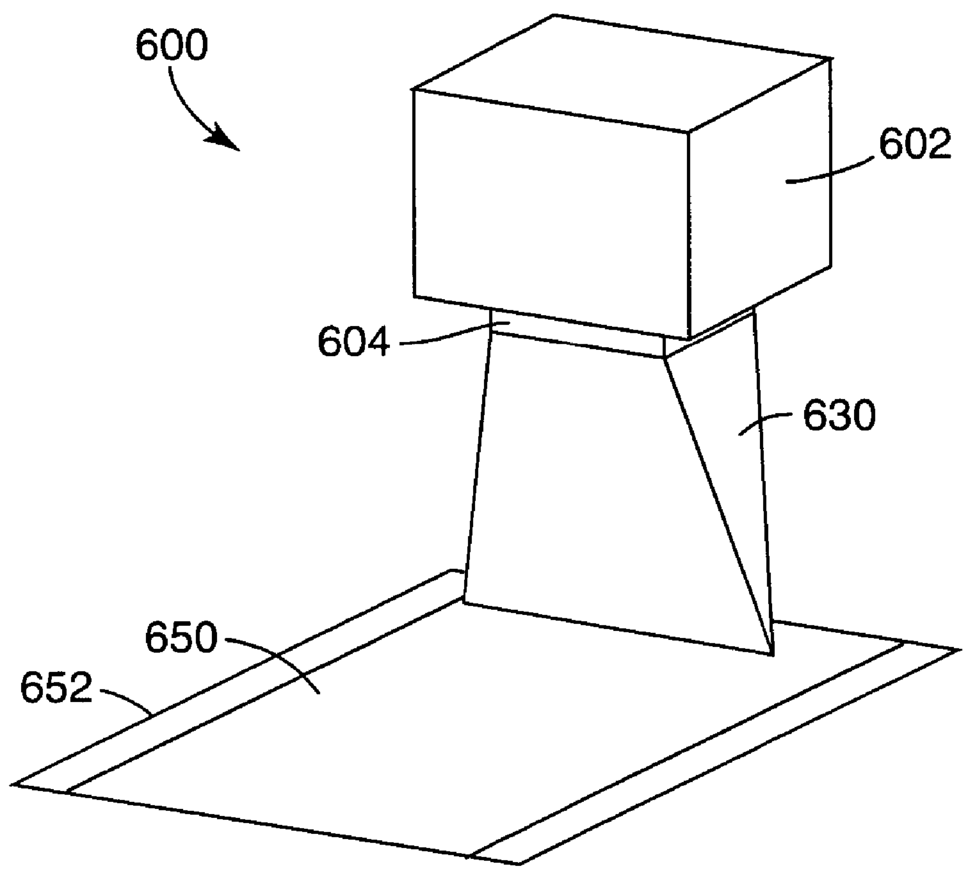
FIG. 12 shows another exemplary implementation of the solid state light device, here utilized as part of a radiation curing apparatus.

In a further alternative application, FIG. 12 shows a schematic bulk material curing apparatus, such as a web curing station. For example, in adhesive, tape, or web-based manufacturing, the adhesive agent is often a blue/UV curable material that must be cured to a different material substrate. In conventional methods, high intensity discharge and arc lamps are often utilized to perform the curing process. However, these conventional discharge lamps radiate light and heat in 360 degrees and therefore require complicated heat exchange and/or cooling mechanisms. Alternatively, the substrate material and UV curing agent must be adapted to withstand high intensity heat in some conventional approaches.

FIG. 12 provides a solution to the heating problems found in conventional curing systems, where a curing station 600 comprises a solid state light device 604 (constructed similarly to those embodiments described above), where the heat dissipation or heat sink component of the solid state light device is located in a heat exchange unit 602. As discussed above, heat generated by the radiation sources of the solid state light device is drawn away from the direction of the light output by proper LED die spacing, thermally conductive interconnect circuitry, and/or heat sinks.

In addition, solid state light device 604 can deliver highly concentrated radiation to radiation-curable materials, thus reducing the deleterious effects caused by poor depth of cure. The concentrated output of the LED dies or other radiation-generating source can be collected and guided by the waveguide array, disposed in strain relief housing 630, and delivered to a radiation curable material 650 disposed on a substrate 652. The substrate 652 can be disposed on a moving platform or conveyor belt to provide for continual curing of large quantities of material. As mentioned above with respect to FIGS. 5A-5F, the output ends of the waveguides, e.g. optical fibers, can be arranged in a number of different reconfigurable patterns, thus making the solid state light device particularly suited for curing materials having a wide variety of shapes, and/or curing depth requirements.

In yet another application, the solid state light source described herein can be utilized in a projection system. Because of the ability to provide pixelated output, the LED die array can comprise different output color LED dies for RGB output. In addition, the output can be multiplexed for progressive scanning to provide a suitable projection image. Further, the solid state light device of the embodiments described above can be utilized as a source for backlighting in LCD displays. In particular, when using phosphor coated dies for "white" emission, pixelated white LED dies can provide an increased contrast ratio for LCD displays.

While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

We claim:

1. A photon emitting device, comprising:

a plurality of solid state radiation sources to generate radiation;

a plurality of optical concentrators, wherein each concentrator receives radiation from a corresponding one of said solid state radiation sources;

a plurality of optical waveguides, wherein each of the plurality of optical waveguides includes a first end and a second end, wherein each first end receives concentrated radiation from a corresponding concentrator, wherein a portion of the plurality of optical waveguides have shaped second ends such that light emitted from the shaped second ends is directed along a light path different from light emitted through non-shaped second ends; and a support structure to stabilize the plurality of optical waveguides between the first and second ends.

2. The photon emitting device according to claim 1, wherein the plurality of solid state radiation sources comprises a plurality of LED dies.

3. The photon emitting device according to claim 2, further comprising:

an interconnect circuit layer to provide electrical connection to the plurality of LED dies, wherein the LED dies are bonded thereon;

a heat sink; and a thermally conductive adhesive to thermally couple the interconnect circuit layer to the heat sink.

4. The photon emitting device according to claim 3, wherein the interconnect circuit layer comprises a metal layer having an electrical interconnect circuit patterned thereon, and a dielectric layer.

5. The photon emitting device according to claim 1, wherein the plurality of waveguides comprise a plurality of polymer waveguides.

6. The photon emitting device according to claim 1, wherein the plurality of waveguides comprises a plurality of optical fibers, the device further comprising a fiber array connector to support the first ends of the plurality of fibers in a defined pattern.

7. The photon emitting device according to claim 6, wherein the support structure comprises a housing, wherein the housing comprises a first aperture to enclose a perimeter of the fiber array connector and a second aperture to enclose at least the first portion of the second ends of the fibers.

8. The photon emitting device according to claim 7, wherein said housing further comprises a third aperture to support a second portion of the second ends of the fibers.

9. The photon emitting device according to claim 7, further comprising a banding to surround and secure at least the first portion of the second ends of the fibers.

10. The photon emitting device according to claim 9, wherein the banding comprises a polymer material that fixes at least the first portion of the second ends of the plurality of fibers in a selected pattern.

11. The photon emitting device according to claim 9, wherein the fiber array connector groups the first ends of the plurality of optical fibers in a pattern and wherein the banding fixes the first portion of the second ends of the plurality of optical fibers such that the plurality of optical fibers are uncrossed along a length of the plurality of optical fibers.

12. The photon emitting device according to claim 8, wherein the second ends of the first portion provide output illumination in a first direction and the second ends of the second portion provide output illumination in a second direction different from the first direction.

13. The photon emitting device according to claim 7, wherein the housing provides strain relief for the plurality of optical fibers.

14. The photon emitting device according to claim 7, wherein the second aperture is smaller than the first aperture.

15. The photon emitting device according to claim 6, wherein the support structure comprises a molding epoxy disposed around and between at least a portion of the fibers.

16. The photon emitting device according to claim 8, wherein the plurality of optical fibers comprise polymer coated clad silica fibers having a core and a cladding, said fibers having a core diameter of about 250 micrometers to about 1000 micrometers.

17. The photon emitting device according to claim 3, wherein the plurality of waveguides comprises a plurality of optical fibers, further comprising:

a fiber array connector to support the first ends of the plurality of optical fibers in a defined pattern; and a sheeting to support the array of optical concentrators, wherein the optical concentrators comprise non-imaging reflective couplers.

18. The photon emitting device according to claim 17, further comprising:

a first alignment pin disposed longitudinally along a length of the illumination device, wherein the interconnect circuit layer, heat sink, fiber array connector and sheeting each include a first alignment hole to receive the first alignment pin.

19. The photon emitting device according to claim 17, wherein a first surface of the fiber array connector includes a plurality of longitudinally disposed protrusions, wherein a first surface of the sheeting includes a corresponding plurality of longitudinally disposed depressions engageably mateable with the protrusions.

20. The photon emitting device according to claim 8, wherein the second portion of second ends have shaped second ends such that light emitted from the shaped second ends is directed along a light path different from light emitted through non-shaped second ends.

21. The photon emitting device according to claim 1, further comprising:

an optical element to collect and distribute optical radiation from the optical waveguide second ends in a selected light distribution pattern.

22. The photon emitting device according to claim 2, wherein each LED die is spaced apart from its nearest neighbor by a spacing length that is greater than a width of the LED die.

23. The photon emitting device according to claim 2, wherein the spacing length is greater than or equal to six LED die widths.

24. The photon emitting device according to claim 2, further comprising:

an interconnect circuit layer to provide electrical connection to the plurality of LED dies, wherein the plurality of LED dies is arranged in a first grouping and a second grouping, wherein the first grouping of LED dies is connected to a first portion of the interconnect circuit layer and the second grouping of LED dies is connected to a second portion of the interconnect circuit layer.

25. The photon emitting device according to claim 24, wherein the plurality of LED dies is further arranged in a third grouping of LED dies and wherein the third grouping of LED dies is connected to a third portion of the interconnect circuit layer.

26. The photon emitting device according to claim 24, wherein a first output intensity of at least one LED die of the first grouping of LED dies is controllable separate from a second output intensity of at least one LED die of the second grouping of LED dies.

27. The photon emitting device according to claim 26, wherein the plurality of optical waveguides comprises a plurality of optical fibers, wherein emission from the first grouping of LED dies is in optical communication with a first group of optical fibers, and wherein emission from the second grouping of LED dies is in optical communication with a second group of optical fibers.

28. The photon emitting device according to claim 27, wherein the second ends of the second group of optical fibers emit radiation in a second direction different from a first direction of radiation emitted by the second ends of the first group of optical fibers.

29. The photon emitting device according to claim 25, wherein the first grouping of LED dies comprise red emitting LED dies, wherein the second grouping of LED dies comprise blue emitting LED dies, and wherein the third grouping of LED dies comprise green emitting LED dies.

30. The photon emitting device according to claim 6, wherein the fiber array connector is adapted to engage in a receptacle.

31. The photon emitting device according to claim 2, wherein at least a portion of the plurality of LED dies comprise ultraviolet emitting LED dies.

32. The photon emitting device according to claim 2, wherein each LED die is in optical communication with a phosphor material to convert an output emission of each LED die to a different colored light.

33. A vehicle headlight comprising the photon emitting device according to claim 1.

34. A dental curing apparatus comprising the photon emitting device of claim 1.

35. A projection system comprising the photon emitting device of claim 1.

36. An LCD display comprising the photon emitting device of claim 1, wherein the photon emitting device is adapted for backlighting.

37. A photon emitting system, comprising:

a solid state light source, comprising a plurality of LED dies to generate optical radiation, a plurality of optical concentrators, wherein each optical concentrator receives illumination from a corresponding one of said LED dies, and a plurality of optical fibers, wherein each of the plurality of optical fibers includes a first end and a second end, wherein each first end receives concentrated illumination from a corresponding optical concentrator; and a controller, coupled to the solid state light source, to selectively activate one or more groups of the plurality of LED dies, wherein the controller sends an increased drive current to a first LED die channel in response to an elevated temperature.

38. The photon emitting system according to claim 37, further comprising:

an interconnect circuit layer to provide electrical connection to the plurality of LED dies and electrically coupled to the controller;

a heat sink; and a thermally conductive adhesive to thermally couple the interconnect circuit layer to the heat sink.

39. The photon emitting system according to claim 37, wherein the solid state light source further comprises:

a fiber array connector to support the first ends of the plurality of optical fibers in a defined pattern; and a sheeting to support the array of optical concentrators.

40. The photon emitting system according to claim 39, further comprising a support structure, having a first aperture to enclose a perimeter of the fiber array connector and a second aperture, to stabilize the plurality of optical waveguides between the first and second ends.

41. The photon emitting system according to claim 37, wherein the LED die array comprises a first grouping of red emitting LED dies, a second grouping of blue emitting LED dies, and a third grouping of green emitting LED dies.

42. The photon emitting system according to claim 37, wherein the controller selectively activates a first LED die channel in response to a trigger signal.

43. The photon emitting system according to claim 37, wherein the controller sends an increased drive current to a first LED die channel to compensate for a reduced emission output from a second LED die channel.

44. A vehicular headlight illumination system comprising a solid state light source located in a first vehicle compartment to generate a selected illumination pattern, the solid state light source comprising a plurality of solid state light emitters, each of the solid state light emitters being optically coupled to a plurality of corresponding optical fibers, wherein heat generated by the solid state light source is distributed to a location apart from the first compartment.

45. The vehicular headlight illumination system according to claim 44, wherein the selected illumination pattern is steerable.

46. The vehicular headlight illumination system according to claim 45, wherein the solid state light emitters face a common direction and wherein the optical fibers are divided into at least three groups, a forward facing group, a right facing group, and a left facing group, and wherein selected illumination pattern is steerable by triggering the output of light through the different groups of optical fibers.

* * * * *